United States Patent [19]
Petretti

[11] 4,082,347
[45] Apr. 4, 1978

[54] COVER ASSEMBLY

[75] Inventor: Raymond H. Petretti, Whitestone, N.Y.

[73] Assignee: Toneray Covers, Inc., Whitestone, N.Y.

[21] Appl. No.: 745,061

[22] Filed: Nov. 26, 1976

Related U.S. Application Data

[62] Division of Ser. No. 567,498, Apr. 14, 1975, Pat. No. 4,030,780.

[51] Int. Cl.$^2$ .............................................. B60J 7/06
[52] U.S. Cl. ...................................... 296/98; 296/100
[58] Field of Search ............... 296/100, 98, 113; 52/3, 52/5; 160/67

[56] References Cited

U.S. PATENT DOCUMENTS

| | | | |
|---|---|---|---|
| 1,313,772 | 8/1919 | Winans | 296/113 |
| 3,366,414 | 1/1968 | Thompson | 296/100 |
| 3,498,666 | 3/1970 | Harrawood | 296/100 |
| 3,656,802 | 4/1972 | White | 296/100 |
| 3,829,154 | 8/1974 | Becknell | 296/100 |
| 3,868,142 | 2/1975 | Bachand | 296/100 |

*Primary Examiner*—Robert R. Song
*Attorney, Agent, or Firm*—Holland, Armstrong, Wilkie & Previto

[57] ABSTRACT

A cover assembly for an open truck which may be automatically or manually opened and closed.

1 Claim, 11 Drawing Figures

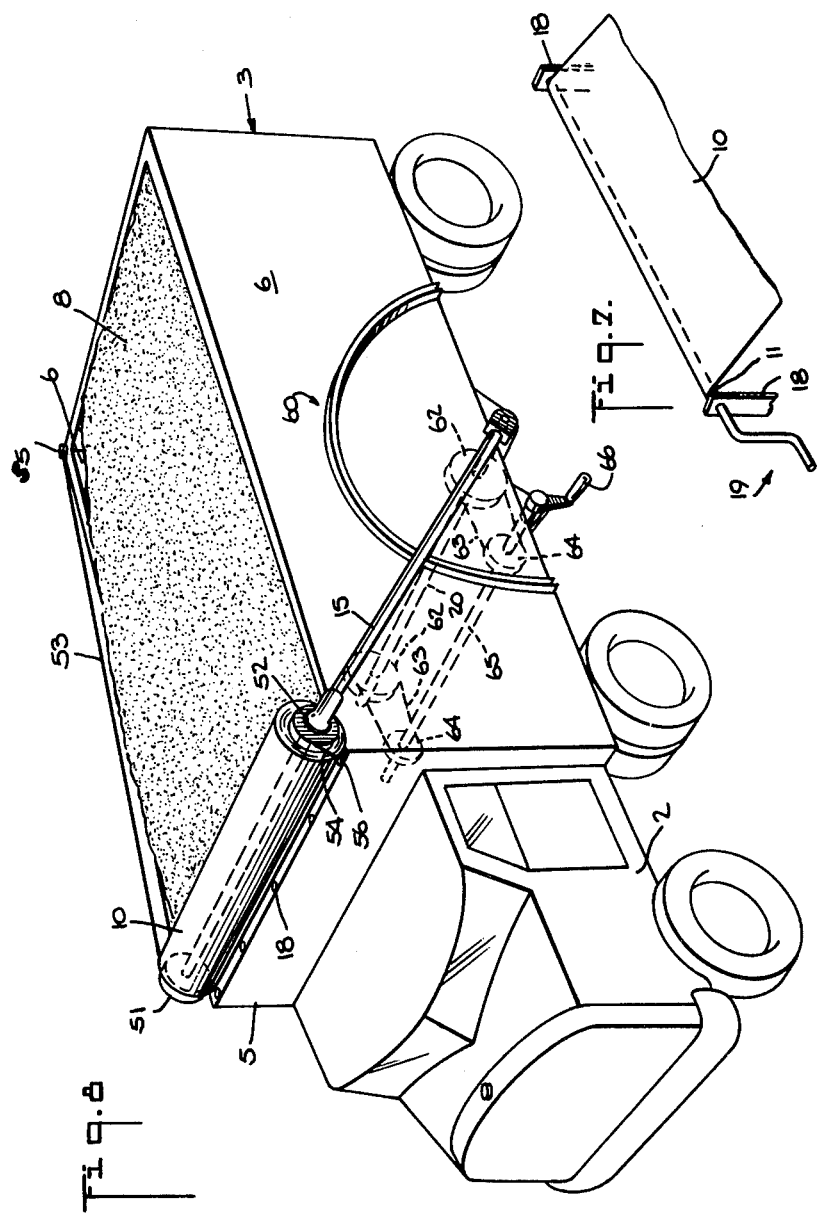

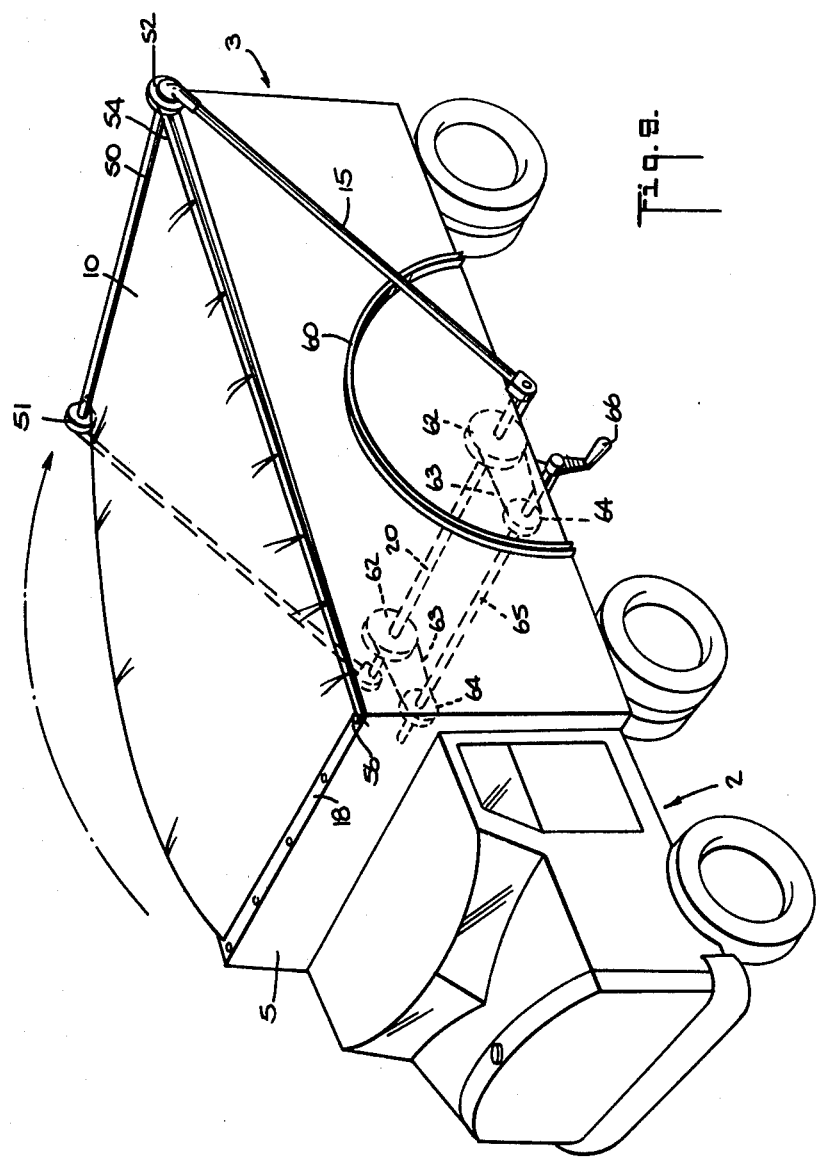

COVER ASSEMBLY

This application is a division of pending U.S. application Ser. No. 567,498 filed Apr. 14, 1975, now Pat. No. 4,030,780.

DESCRIPTION

The present invention is directed to a truck with a convertable top and more particularly to an open truck, such as a dump truck in which the canvas cover is movable from a load covering position to a load uncovering position.

It is customary for dump trucks to have the dump bodies open at the top so that they can be easily filled with a load. When the load is to be dumped, a rear wall of the open truck is adapted to swing open and the open body is tilted upwardly to dump the load.

When transporting the load from one place to the other, it is desirable for the load to be covered in order to prevent the debris from being ejected from the open body and to prevent contamination of the air or the streets.

Presently, canvas covers which are used to cover trucks are adapted to be rolled and unrolled from the truck.

If this operation were to be performed manually, there would be quite a bit of time lost. In order to avoid this time-consuming operation, a number of mechanisms have been developed in which a canvas for an open truck is automatically rolled over the truck during transport and unrolled when the load is to be dumped.

The present invention is directed to an improved cover mechanism in which the cover is automatically rolled and unrolled over the load.

Another object of the present invention is a provision of an improved cover mechanism in which the cover can be easily moved over the top of the load.

Another object of the present invention is the provision of an improved cover mechanism in which the cover is positively held in place.

Another object of the present invention is the provision of an improved cover mechanism which will take advantage of various shapes of the truck bodies.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 7 is a fragmentary perspective view showing another mechanism for covering and uncovering the load;

FIG. 8 is a perspective view showing another embodiment of the present invention with the cover in the open position;

FIG. 9 is a perspective view similar to FIG. 8 showing the truck with the cover in the closed position;

Figure 1:
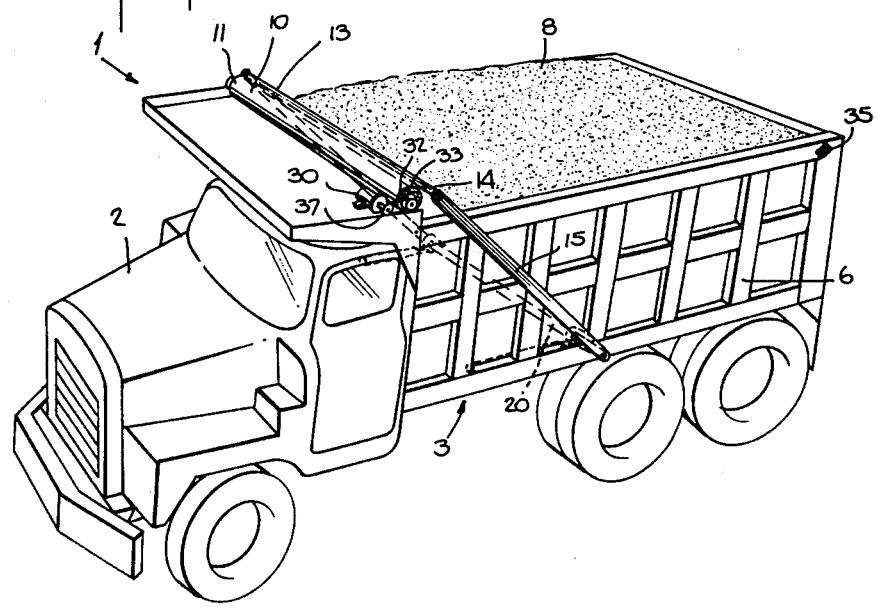
FIG. 1 is a perspective view showing a dump truck incorporating the present invention with the cover in the open position.
Figure 2:
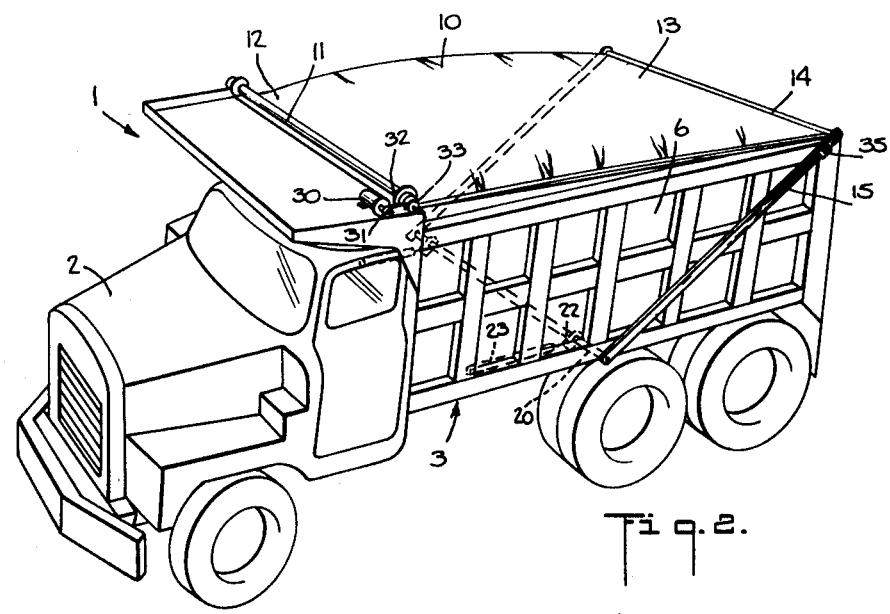
FIG. 2 is a similar perspective view showing the cover in the closed position.
Figure 3:
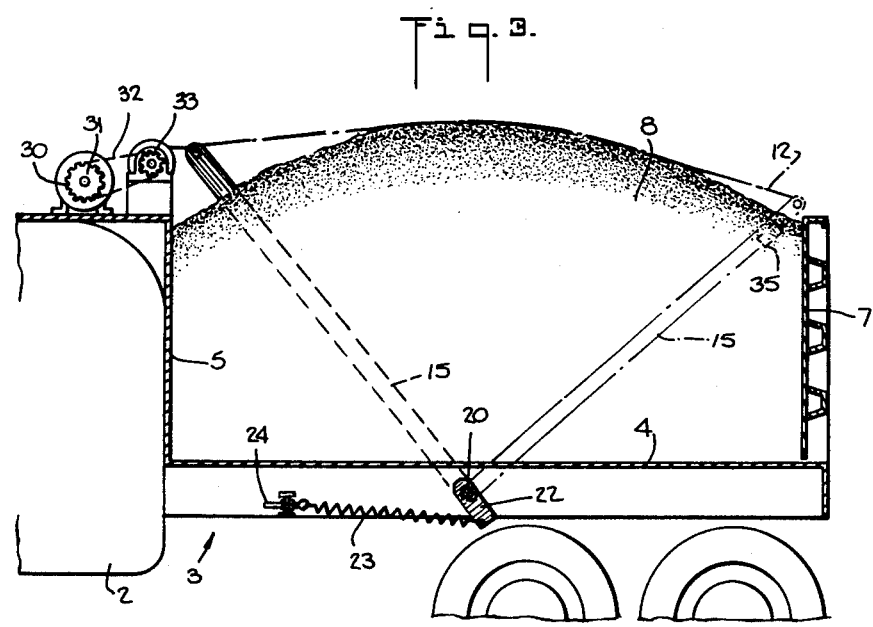
FIG. 3 is a schematic sectional side view showing the cover mechanism of the present invention.
Figure 4:
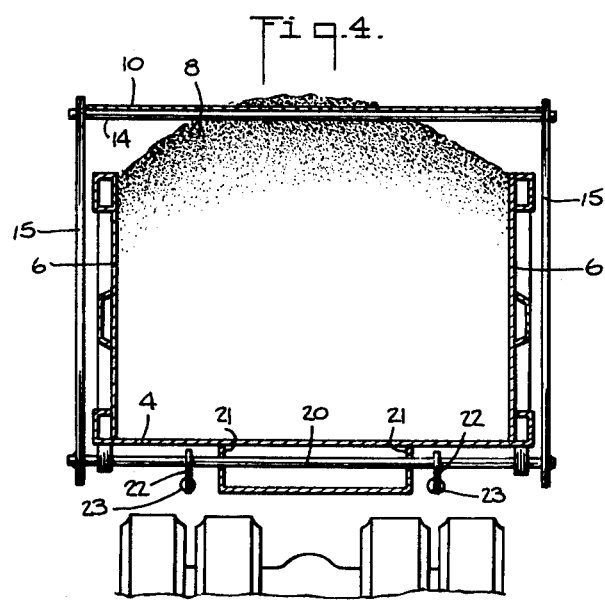
FIG. 4 is a schematic sectional end view showing the present invention.

Referring more particularly to FIGS. 1 through 4, a dump truck 1 is shown which may be used in connection with the present invention. The truck 1 comprises a front cab 2 and a rear tiltable dump body 3 having a bottom wall 4, a front wall 5, a pair of side walls 6 and a rear wall 7. The rear wall 7 is preferably adapted to pivotally open when the dump body 3 is tilted upwardly to dump a load 8 therefrom.

A cover 10, which may be made of canvas material is rolled around a take-up roller 11 mounted above the cab 1 and has its inner end 12 anchored to the take-up roller 11 and its outer end 13 mounted on a cross bar 14. The cross bar 14 extends across and above the tops of the walls 6 and is journalled at each end to a pair of arms 15, which extend downwardly along the outside of side walls 6. The arms 15 are joined together by a pivot rod 20 which is beneath the bottom wall 4 and is journalled in mounts 21 depending therefrom. Fingers 22 are mounted on and extend downwardly from the rod 20 and have springs 23 extending forwardly therefrom and mounted on the dump body 3 by adjustment bolts 24 to bias arms 15 in a rearwardly load-covering direction.

The opening and closing of the canvas 10 is controlled by a motor 30 having toothed sprocket 31 mounted thereon and comprising a chain 32 in operative engagement therewith sprocket 31 and in operative engagement with sprocket 33 coextensive with take-up roller 11.

When the cover 10 is in the open position (FIG. 1), the canvas is rolled around the take-up roller 11 and held in place by the sprocket and chain assemblys 31, 32 and 33. When it is desired to unroll the canvas to a load covering position (FIG. 2), the motor 30 is activated from a position inside the cab 2. The motor 30 and sprocket 31 rotate in a one direction (clockwise in FIGS. 1 to 3) which causes sprocket 33 and roller 11 to rotate in a clockwise direction. As the canvas 10 is unrolled, springs 23 will exert pressure on fingers 22 to move the arms 15 back toward the rear to unroll the canvas and cover the load. At the rear, the arms 15 are held in place by locking means, such as clips 35, which prevent the springs 23 from exerting any bias on the arms 15 when the arms are in the most rearward load-covering position. The locking means 35 also prevents any inadvertant movement of the arms and any inadvertant opening of the cover 10.

When the load 8 is to be uncovered (FIG. 1), the motor 30 is again activated but this time it rotates in the opposite direction (counter-clockwise in FIGS. 1 to 3) together with the sprocket 31 so that sprocket 33 and the take-up roller 11 rotate counter-clockwise to roll up the canvas 10 on the roller 11 and pull the arms 15 back against action of springs 23 to the forward part of the dump body to thereby uncover the load 8.

Figure 5:
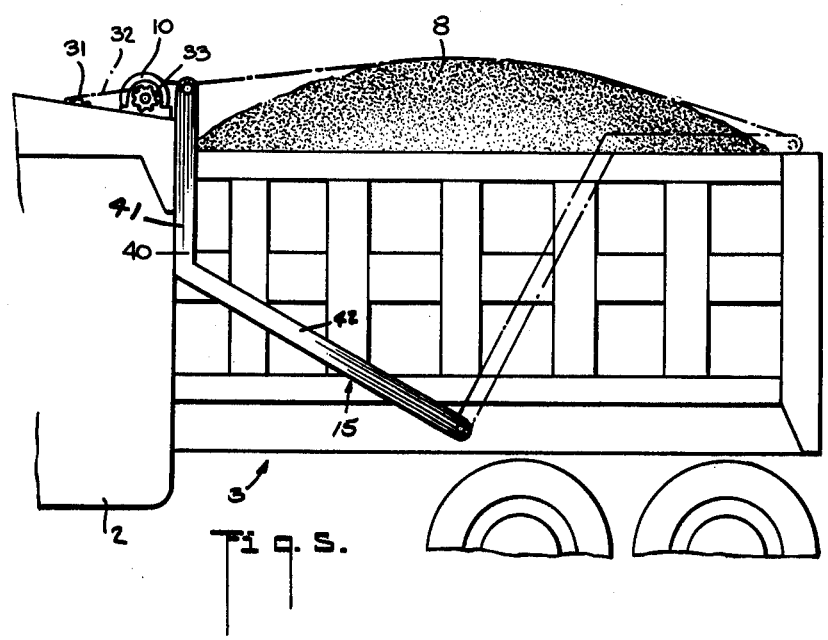
FIG. 5 is a side elevational view showing a modification of the arms.
Figure 6:
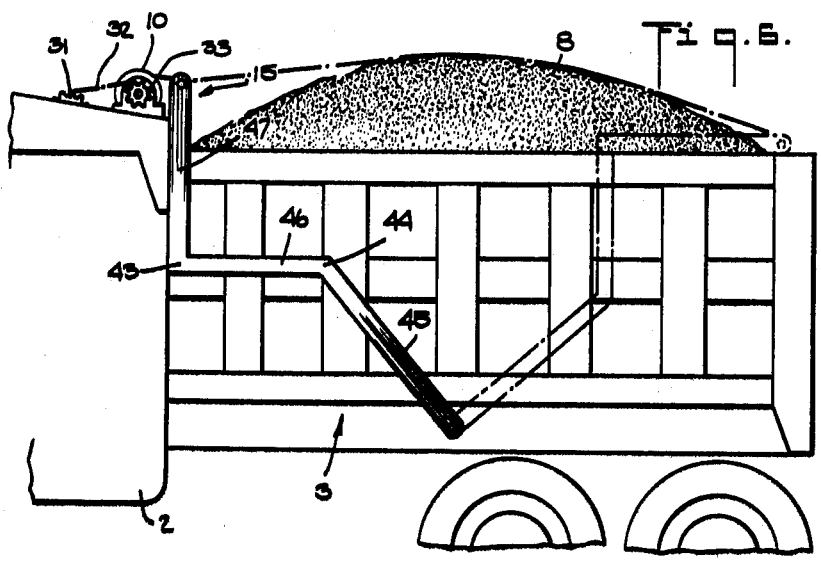
FIG. 6 is a side elevational view showing still another modification of the arms.
Figure 10:
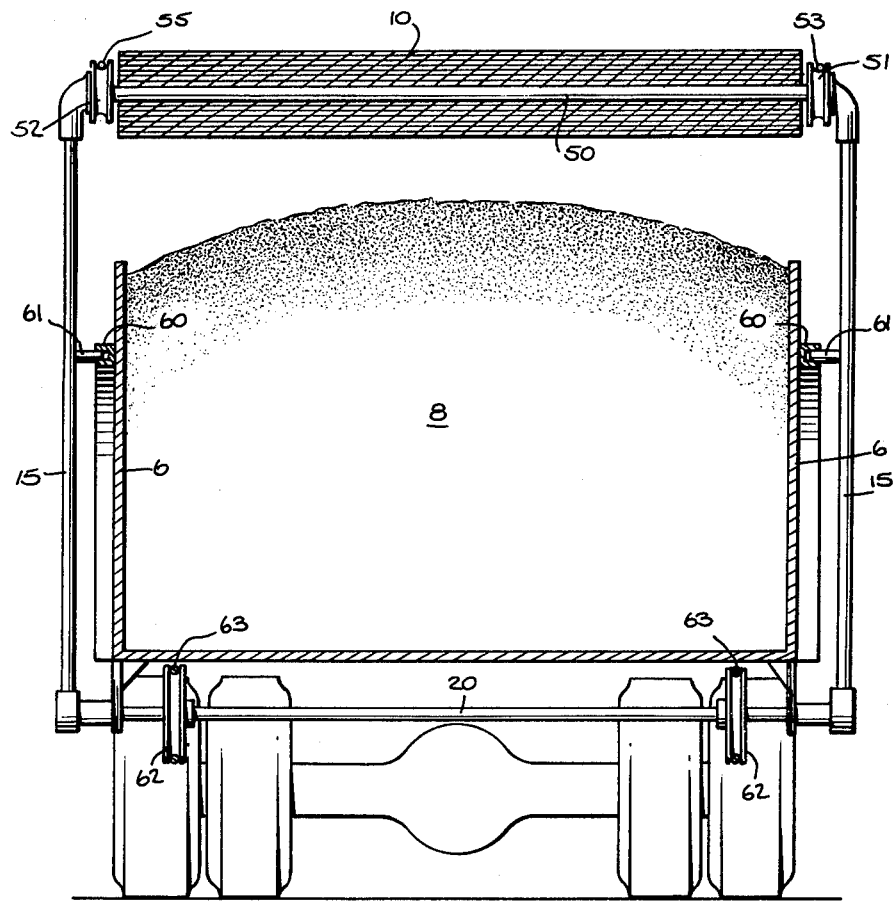
FIG. 10 is a transverse sectional view of the modification shown in FIGS. 8 and 9.

FIG. 5 shows another embodiment of the present invention in which the arms 15 are bent at 40 to form arm portions 41 and 42. These modified arms may be used with a low dump body. FIG. 6 shows another embodiment of the present invention in which the arms are shown with a plurality of bends 43 and 44 to form arm portions 45, 46 and 47. These may be used with dump bodies of a different shape. In all other respects, the inventions shown in FIGS. 5 and 6 operate in a manner similar to the invention described in FIGS. 1 through 4.

If desired, the motor, sprocket, and chain assembly can be substituted by the hand assembly shown in FIG. 7. In this event, the roller 11 is mounted on upstanding brackets 18 with a handle 19 extending from one end thereof. When the handle 19 is rotated in one direction a simple spring mechanism (as shown in FIGS. 1 to 4) will move the cover 10 backward to cover the load. When the handle 19 is rotated in the opposite direction, the cover 10 will be rolled up on the roller 11 to uncover the load.

Alternatively, the handle 19 may be placed directly on the sprocket 33 of FIG. 1.

FIGS. 8 through 11 shown another embodiment of the present invention. In this embodiment, a take-up rod 50 is rotationally mounted on arms 15 and is adapted to have cover 10 rolled thereon when the arms are in the forward load uncovering position and to be unrolled when arms 15 move rearwardly to cover the load.

The cover 10 is anchored to the top of front wall 5 at 18.

At each end of roller rod 50 is a pulley 51 and 52. The pulley 51 is controlled by a cable 53 mounted on pulley 51 at one end and anchored at its other end to the rear end of one wall 6 at 55. The pulley 52 is controlled by and has mounted thereon one end of a cable 54 which is anchored at its other end to the front end of the other side wall 6 at 56.

With this construction, the pulleys 51 and 52 are caused to rotate in opposite directions when the rod 50 is moved forwardly or rearwardly. With the rod 50 in the forward load uncovering position (FIG. 8) and the cover rolled thereabout, the cable 54 is wound around the pulley 52 and the cable 53 on the other side of the dump body is in its unwound position. As the cover 10 is moved rearwardly to a load covering position (FIG. 9), the cable 54 begins to unwind from the pulley 52 causing the pulley 52 to rotate in one direction (clockwise in FIGS. 8 and 9) together with rod 50 and pulley 51. This causes the cover 10 to unwind and also causes the cable 53 anchored at the rear 55 to wind around pulley 51.

When the rod 50 is moved to a forward uncovering position (FIG. 8), the cable 53 anchored at the rear 54 begins to unwind from pulley 51 causing the pulley 51 to move in the opposite direction (counter-clockwise in FIGS. 8 and 9) to cause rod 50 to rotate in a counter-clockwise direction to wind the canvas 10 thereabout and to rotate the pulley 52 in a counter-clockwise direction to permit the cable 54 to wind thereabout.

Figure 11:
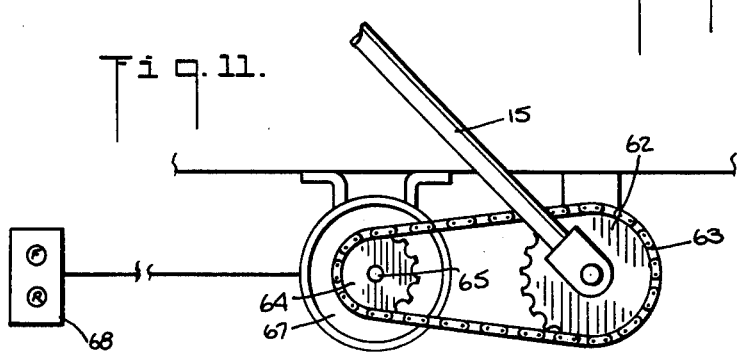
FIG. 11 is a detail of a control mechanism.

The arms 15 are preferably engaged in an arcuate slot on back side wall 6 by means of pins 21. The lower edges of the arms 15 are connected together by a cross bar 20 which has a pair of sprockets 62 and chain 62 mounted thereon. The chains 63 are controlled by sprockets 64 on a control rod 65. The control rod 65 may be manually operated by handle 66, as shown in FIGS. 8 and 9 or it may be operated by a motor 67 controlled by a switch 68, as shown in FIG. 11.

When the control rod 65 is rotated in one (clockwise) direction, either manually or electrically, the arms 65 and rod 50 will move to a rear position to cover the load as shown in FIG. 8. When the control bar 65 is rotated in the opposite (counter-clockwise) direction, the arms 15 and rod 50 will be moved backwardly to roll up the canvas and uncover the load.

It will be understood that the sprockets, chains, and motors in all the embodiments shown are adapted to be protected by suitable covers which have not been shown in the drawing for ease in description.

Although the controls for the motors in all the embodiments have been described as being within the cab, it will be understood that the controls can be located in any other convenient place.

While the application has been described in connection with an open dump truck, it will be understood that the invention is adapted to be used in connection with any open topped body, such as an open container which may be stationary or may be removable from a truck to be filled.

Hence, it will be seen that the present invention is directed to an improved mechanism in which the mechanism is rolled over the load and in which the canvas can be easily made to cover the top from inside the cab.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A cover assembly for a truck having a front cab portion and a rear tiltable open dump body, said cover assembly comprising a flexible cover, a rotatable rod at the front end of the open body, said cover being rolled around said rod and having one end mounted thereon, a cover pulling bar extending across the top of the open body and movable from one end of the open body to the other end of the open body, the other end of said cover being mounted on said pulling bar, a rotatable gear mechanism for controlling the rotation of said rod, said gear mechanism comprising a first sprocket mounted on the rotatable rod and a power source, said power source including a second sprocket and a chain connecting said first and second sprockets together, means for rotating the rotatable gear mechanism in one direction to rotate the rod in one direction to unroll the cover, means for moving the pulling bar toward the rear of the open body in one direction while the rod is being rotated in said one direction to move the cover to a body-covering position, means for rotating the rotatable gear mechanism in the opposite direction to rotate the rod in the opposite direction to roll up the cover and move the cover pulling bar toward the front of the open body, said cover pulling bar mounted on the upper ends of a pair of arms extending from opposite ends of the pulling bar along the sides of the open body, the lower ends of said arms are pivoted on a lower common shaft which extends transversely of and below the open body, said shaft being pivotally mounted below the open body, a finger extending from said lower shaft in a direction away from said arms, said finger being located below said open body, said bar-moving means comprising a spring, an adjustment bolt mounted on the forward portion of and below said open body, said spring having one end connected to said finger and its other end connected to said adjustment bolt and being spaced below said body when said cover is in its open position, the tension of the spring being adjustable by rotating the said adjustment bolt and lock clips adjacent the rear of the open body to hold the arms in the cover-closing rear position.

* * * * *